![United States Patent Office logo text]

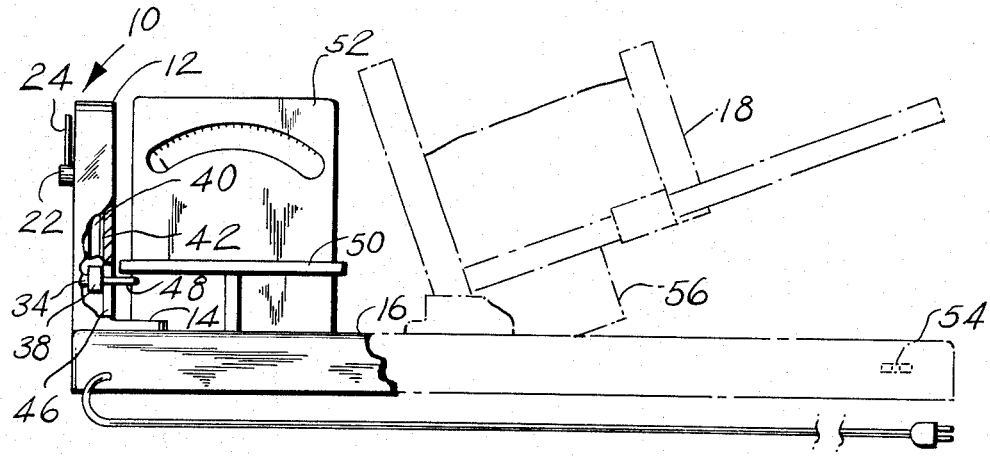

3,220,498
Patented Nov. 30, 1965

---

3,220,498
AUTOMATIC WEIGHING AND SHUTOFF APPARATUS FOR SLICING MACHINES
Anthony De Paro, 957 E. 226th St., Bronx 66, N.Y., and Thomas H. Francis, 2101 Madison Ave., New York, N.Y.
Filed May 6, 1964, Ser. No. 365,430
6 Claims. (Cl. 177—48)

This invention relates to scales and more particularly to an apparatus for automatically weighing and shutting off automatic meat slicers and the like.

It is an object of the present invention to provide an automatic weighing and shutoff apparatus for slicing machines which will be used by various establishments which handle cold cuts and cheese in quantity.

Another object of the present invention is to provide an automatic weighing and shutoff apparatus for slicing machines which will be an attachment for slicing machines and may also be incorporated in the overall design of a new machine.

A further object of the present invention is to provide an automatic weighing and shutoff apparatus for slicing machines which will have an adjustment knob which will only have to be set by the clerk to the amount of weight the customer desires. When the meat or cheese is placed upon the machine, the automatic slicer, when turned to the on position, slices the meat or cheese, and the picker arm of the automatic slicer places the meat on top of the scale, and when the platform of the scale descends to a specific point determined by the adjustment knob which raises or lowers a microswitch, the automatic action takes place and the microswitch breaks the circuit, and thus the entire amount of meat without monitoring the apparatus is secured. In the case where the aforementioned apparatus is installed in a store, the clerk may be busy gathering other items, saving a maximum amount of time, and in many instances, eliminating some of the clerk's attention ordinarily required, which will mean substantially more profit to the store owner having such a device.

A still further object of the present invention is to provide an automatic weighing and shutoff apparatus for slicing machines which will prevent the loss of customers who become impatient and tired of waiting to be served.

Other objects of the invention are to provide an automatic weighing and shutoff apparatus for slicing machines bearing the above objects in mind which is of simple construction, has a minimum number of parts, is inexpensive to manufacture and efficient in operation and in use.

For other objects and for a better understanding of the invention, reference may be had to the following detailed description taken in conjunction with the accompanying drawing, in which:

FIGURE 1 is a side elevational view comprising the present invention with the automatic slicer section shown in phantom lines;

FIGURE 2 is an enlarged fragmentary view showing the internal mechanism components of the invention;

FIGURE 3 is a cross sectional view taken along the lines 3—3 of FIGURE 2;

FIGURE 4 is an end view of FIGURE 2 shown partly broken away; and

FIGURE 5 is a schematic wiring diagram of the present invention.

Referring to the drawing, an automatic weighing and shutoff apparatus for slicing machines 10 made in accordance with the present invention is shown to include a hollow housing 12 of rectangular configuration having a foot 14 at its lower extremity which is secured to an automatic slicer base 16 by suitable fastening means (not shown). An automatic slicer 18 is secured to base 16, and an opening 20 through housing 12 freely and rotatably receives shaft 21 having adjustment knob 22. Knob 22 is provided with a pointer 24 which may be aligned with any of a plurality of spaced apart graduations 26 upon the face of housing 12 which indicate ounces and pounds in weight measure. A lever arm 28 is secured to the end of shaft 21 and an elongated rod 30 is secured by means of a pivot pin 32 to the extremity of lever arm 28. The lower extremity of elongated rod 30 is received between a pair of lugs 34 by means of a pivot pin 36 and the rotation of knob 22 provides a means for raising and lowering a normally closed microswitch 38 secured to lugs 34. Guide means for microswitch 38 within housing 12 is provided for by an elongated, U-shaped channel member 40 having extended flanges 42 which are fixedly secured to the interior of housing 12 by suitable fasteners (not shown). Microswitch 38 is freely and slidably received within channel member 40 and lugs 34 of normally closed microswitch 38 are freely and slidably received within a rectangular opening 44 of channel member 40, and an opening 46 of rectangular configuration through housing 12 freely and slidably receives the trip arm 48 of normally closed microswitch 38. Normally closed microswitch trip arm 48 is actuated by the underside of platform 50 of a double-faced scale 52 of conventional design secured to base 16. A switch 54 provides means for switching on motor 56 which operates automatic slicer 18.

In operation, the adjustment knob 22 and associated pointer 24 are rotated to any one of the graduations 26 which provide a means for adjusting the apparatus 10 to a predetermined weight. When knob 22 is rotated, lever arm 28 secured to elongated rod 30 secured to lugs 34 of normally closed microswitch 38 raises or lowers microswitch 38. The operator then places the meat or cheese into the automatic slicer 18 and flips the switch to the on position. The automatic slicer then slices the meat or cheese, and by picker means (not shown) places the product on the top of the platform 50 which will descend according to the weight placed upon it. When platform 50 descends and trips trip arm 48 of normally closed microswitch 38, the circuit to motor 56 is broken and the slicing operation is stopped. Thus, the desired amount of meat or cheese is obtained without having to monitor the automatic slicer.

It shall be noted that for the customer's convenience the double-faced scale 52 attached to the mechanism of the scale platform 50 will simultaneously register the weight of the meat being sliced and its contained pointer arms will stop at the predetermined weight setting when the trip arm 48 of normally closed microswitch 38 is depressed by platform 50.

It shall further be noted that various friction device means may be incorporated in various points of the mechanical components of housing 12 to prevent slipping of the adjustment by vibration.

While various changes may be made in the detail construction, it shall be understood that such changes shall be within the spirit and scope of the present invention as defined by the appended claims.

What we claim as new and desire to protect by Letters Patent of the United States is:

1. An automatic weighing and shutoff apparatus for automatic slicing machines comprising, in combination, a rectangular, hollow housing providing enclosure means for a plurality of mechanical components, an adjustment knob carried by said housing providing a means for predetermining a weight setting for sliced meats or the like, a lever arm and a connected reciprocating rod carried within said housing providing a means for raising and lowering a normally closed microswitch carried within said housing, a U-shaped channel member carried within said housing providing guide means for said normally closed microswitch, said microswitch providing shutoff means for an automatic slicer, said hollow housing containing said components being provided with foot means at its lower extremity, said foot means providing mounting means for said housing by suitable fasteners to said base of an automatic slicer, an opening through one face of said housing rotatably receiving the shaft of said adjustment knob, and said adjustment knob being provided with pointer means which aligns with anyone of a plurality of spaced apart graduations upon the face surface of said housing and said adjustment knob providing predetermined setting means for the desired quantity of sliced meat or the like.

2. The combination according to claim 1 wherein said shaft of said adjustment knob secured to a lever arm provides crank means for said reciprocating rod, and said lever arm is secured by pivot pin means to the upper extremity of said elongated rod within said housing, and the lower end of said elongated rod is provided with an elongated opening for receiving a pivot pin to secure the lower extremity of said elongated rod within a pair of lugs extending from said normally closed microswitch which provides shutoff means for said automatic slicer.

3. The combination according to claim 2 wherein said normally closed microswitch is freely and slidably received within an elongated channel of U-shaped configuration and said channel member is secured to the opposite face of said housing receiving said adjustment knob and flange means projecting from said channel member are secured to the interior of said housing and said channel member provides a guide means for said microswitch.

4. The combination according to claim 3 wherein said legs of said normally closed microswitch are freely and slidably received within a rectangular slot through said channel member within said housing, and the trip arm of said normally closed microswitch is freely and slidably received within a rectangular opening through one face of said housing, and said rectangular openings of said housing and of said channel member are parallel to each other.

5. The combination according to claim 4 wherein said adjustment knob and its associated pointer provide a predetermined weight seting for meat or the like to be sliced, and when said knob is rotated, said microswitch is descended or ascended, and when the platform of the scale secured to the base of said automatic slicer descends, said platform, when reaching a certain point from the weight of said meat or the like upon it, depresses said trip arm of said normally closed microswitch, thus opening the circuit of the motor of said automatic slicer, leaving the attendant free during the slicing operation for other work.

6. The combination according to claim 5 wherein said normally closed microswitch providing predetermined weight measure for meat or the like being automatically sliced is in series circuit with said motor of said automatic slicer and when tripped, opens said circuit.

References Cited by the Examiner
UNITED STATES PATENTS

| | | | |
|---|---|---|---|
| 888,615 | 5/1908 | Humpreys | 177—52 |
| 1,058,305 | 4/1913 | Hogaboom | 177—48 X |
| 1,481,282 | 1/1924 | Cole | 177—48 |
| 2,903,032 | 9/1959 | Cervene | 146—94 |
| 3,006,469 | 10/1961 | Craig | 209—121 |
| 3,162,258 | 12/1964 | Schmidt | 177—52 X |

LEO SMILOW, *Primary Examiner.*